US010375299B2

(12) United States Patent
Sato et al.

(10) Patent No.: US 10,375,299 B2
(45) Date of Patent: *Aug. 6, 2019

(54) IMAGING DEVICE AND IMAGING METHOD USING COMPRESSED SENSING

(71) Applicant: Panasonic Intellectual Property Management Co., Ltd., Osaka (JP)

(72) Inventors: Satoshi Sato, Kyoto (JP); Takeo Azuma, Kyoto (JP); Hiroyuki Motoyama, Osaka (JP); Jun Ozawa, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/136,741

(22) Filed: Sep. 20, 2018

(65) Prior Publication Data

US 2019/0020814 A1 Jan. 17, 2019

Related U.S. Application Data

(63) Continuation of application No. 15/418,143, filed on Jan. 27, 2017, now Pat. No. 10,110,808, which is a
(Continued)

(30) Foreign Application Priority Data

May 29, 2013 (JP) .................................. 2013-112639

(51) Int. Cl.
*H04N 5/232* (2006.01)
*H04N 5/347* (2011.01)
(Continued)

(52) U.S. Cl.
CPC ......... *H04N 5/23229* (2013.01); *H04N 5/232* (2013.01); *H04N 5/347* (2013.01);
(Continued)

(58) Field of Classification Search
CPC .... H04N 5/23229; H04N 5/232; H04N 5/347; H04N 5/357; H04N 5/374
See application file for complete search history.

(56) References Cited

U.S. PATENT DOCUMENTS 5,949,483 A * 9/1999 Fossum ................ G11C 19/282
　　　　　　　　　　　　　　　　　　　348/303
6,222,175 B1 * 4/2001 Krymski .............. H04N 5/3575
　　　　　　　　　　　　　　　　　　　250/208.1
(Continued)

FOREIGN PATENT DOCUMENTS

JP　　2004-032517 A　　1/2004
JP　　2010-147834 A　　7/2010
(Continued)

OTHER PUBLICATIONS

J. Ma, "Improved Iterative Curvelet Thresholding for Compressed Sensing and Measurement", IEEE Trans. Instrum. Meas., vol. 60, No. 1, Jan. 2011, pp. 126-136.
(Continued)

*Primary Examiner* — Nicholas G Giles
(74) *Attorney, Agent, or Firm* — McDermott Will & Emery LLP

(57) ABSTRACT

In an imaging device, a difference calculation unit calculates a differential signal between charge signals that have been accumulated and are held by first and charge holding units with different timings. A multiple sampling unit performs multiple sampling processing on the differential signal, and an analog digital conversion unit converts a signal that has undergone multiple sampling processing to a digital signal. That is, multiple sampling processing is performed on a differential signal with a higher sparsity than that of an image signal.

3 Claims, 12 Drawing Sheets

Related U.S. Application Data continuation of application No. 14/754,615, filed on Jun. 29, 2015, now Pat. No. 9,635,250, which is a continuation of application No. PCT/JP2014/002331, filed on Apr. 25, 2014.

(51) Int. Cl.
*H04N 5/357* (2011.01)
*H04N 5/374* (2011.01)
*H04N 5/378* (2011.01)

(52) U.S. Cl.
CPC ............ *H04N 5/357* (2013.01); *H04N 5/374* (2013.01); *H04N 5/378* (2013.01); *G09G 2340/02* (2013.01); *G09G 2370/18* (2013.01)

(56) References Cited

U.S. PATENT DOCUMENTS

| | | | | |
|---|---|---|---|---|
| 7,154,075 B2* | 12/2006 | Krymski | ............ | H04N 3/1562 250/208.1 |
| 7,319,218 B2 | 1/2008 | Krymski | | |
| 9,635,250 B2* | 4/2017 | Sato | ........ | H04N 5/232 |
| 10,110,808 B2 | 10/2018 | Sato | ........ | H04N 5/23229 |
| 2001/0050330 A1 | 12/2001 | Mattison | | |
| 2002/0139921 A1* | 10/2002 | Huang | ............ | H04N 5/365 250/208.1 |
| 2004/0246354 A1* | 12/2004 | Yang | ............ | H04N 3/1562 348/308 |
| 2006/0108506 A1* | 5/2006 | Yang | ............ | H04N 3/1562 250/208.1 |
| 2006/0113458 A1* | 6/2006 | Yang | ............ | H04N 9/045 250/208.1 |
| 2006/0113459 A1* | 6/2006 | Yang | ............ | H04N 5/347 250/208.1 |
| 2011/0068268 A1 | 3/2011 | Heidari | | |
| 2015/0304556 A1* | 10/2015 | Sato | ........ | H04N 5/232 348/222.1 |
| 2017/0201679 A1* | 7/2017 | Sato | ........ | H04N 5/232 |

FOREIGN PATENT DOCUMENTS

| | | |
|---|---|---|
| JP | 2010-245955 A | 10/2010 |
| WO | 2009/091824 A1 | 7/2009 |
| WO | 2011/146153 A1 | 11/2011 |

OTHER PUBLICATIONS

D. Takhar et al., "A New Compressive Imaging Camera Architecture Using Optical-Domain Compression", Proc. of Computational Imaging IV at SPIE Electronic Imaging, 2006.

Y. Oike and A.E. Gamal, "A 256×256 CMOS Image Sensor with DS-Based Single-Shot Compressed Sensing", IEEE International Solid-State Circuits Conference (ISSCC) Dig. of Tech. Papers, pp. 386-387, 2012.

Toshihide Ibaraki et al., "Method of Optimization", Information mathematics course, vol. 14, Kyoritsu Shuppan Co., Ltd., pp. 159-164, Jul. 20, 1993, First Edition/First Copy.

Makoto Nakashizuka, "Sparse Signal Representation and Its Image Processing Application", Journal of the Institute of Image Information and Television Engineers, vol. 65, No. 10, pp. 1381-1386.

Toshiyuki Tanaka, Mathematics of Compressed Sensing, IEICIE Fundamentals Review, vol. 4, No. 1, pp. 39-47, 2010.

International Search Report issued in International Patent Application No. PCT/JP2014/002331, dated Jun. 10, 2014 (with English translation).

U.S. Non-Final Office Action dated Jun. 1, 2016 issued in U.S. Appl. No. 14/754,615.

U.S. Final Office Action dated Oct. 13, 2016 issued in U.S. Appl. No. 14/754,615.

U.S. Notice of Allowance dated Jul. 3, 2018 issued in U.S. Appl. No. 15/418,143.

U.S. Non-Final Office Action dated Feb. 20, 2018 issued in U.S. Appl. No. 15/418,143.

U.S. Final Office Action dated Oct. 4, 2017 issued in U.S. Appl. No. 15/418,143.

U.S. Non-Final Office Action dated Jun. 9, 2017 issued in U.S. Appl. No. 15/418,143.

\* cited by examiner t=1 t=2 t=3

4 × 4 PIXELS t=4

PIXEL NUMBERS OF 4 × 4 PIXELS

| 1  | 2  | 3  | 4  |
|----|----|----|----|
| 5  | 6  | 7  | 8  |
| 9  | 10 | 11 | 12 |
| 13 | 14 | 15 | 16 |

4 × 4 PIXELS t=1

4 × 4 PIXELS t=2

4 × 4 PIXELS t=3

IMAGE WHEN t = 1

IMAGE WHEN t = 2

DIFFERENCE IMAGE

NORMAL CAPTURED IMAGE

RECONSTRUCTION IMAGE

RECONSTRUCTION IMAGE
BASED ON DIFFERENCE IMAGE

IMAGING DEVICE AND IMAGING METHOD USING COMPRESSED SENSING

CROSS-REFERENCE TO RELATED APPLICATIONS

This is a continuation of U.S. patent application Ser. No. 15/418,143, filed on Jan. 27, 2017, which is a continuation of U.S. patent application Ser. No. 14/754,615, filed on Jun. 29, 2015, now U.S. Pat. No. 9,635,250, which is a continuation of International Application No. PCT/JP2014/002331 filed on Apr. 25, 2014, which claims priority to Japanese Patent Application No. 2013-112639 filed on May 29, 2013. The entire disclosures of these applications are incorporated by reference herein.

BACKGROUND

The present disclosure relates to an imaging device using compressed sensing.

In recent years, an image processing technique using "compressed sensing" has drawn attention. This technique is a technique in which a plurality of pixel values are added up and thus an image is captured, thereby compressing the image, and the image is reconstructed by image processing. Normally, when additional imaging is performed, an information amount of an image is lost, the image quality of a reconstruction image is greatly degraded. However, in compressed sensing, image reconstruction using the sparsity of the image is performed, so that a reconstruction image with image quality not inferior to that of an uncompressed image may be obtained while the amount of data is reduced in additional imaging (see, for example, Y. Oike and A. E. Gamal, "A 256×256 CMOS Image Sensor with ΔΣ-Based Single-Shot Compressed Sensing," IEEE International Solid-State Circuits Conference (ISSCC) Dig. of Tech. Papers, pp. 386-387, 2012).

The expression "an image is sparse" herein means a phenomenon in which, when an image is projected by a wavelet transform, a discrete cosine transform (DCT), or the like, many coefficient values are substantially zero. As an image reconstruction method using the sparsity of an image, L0 norm minimization or L1 norm minimization is used in compressed sensing.

In compressed sensing, a data amount may be compressed by simple additional processing before an analog digital converter (which will abbreviated as "ADC", as appropriate) in an image element, and therefore, a drive frequency of ADC may be reduced. Thus, low power consumption, a high SN ratio, and reduction in communication band may be realized.

Japanese Unexamined Patent Publication No. 2010-245955 describes a solid-state image sensor using the concept of compressed sensing. In the solid-state image sensor, a different wiring is coupled to each of a plurality of pixels, and a plurality of pixels of a pixel group are sequentially driven with timings with their phases being shifted and thus reads out a signal. With this configuration, a sample and hold circuit is not needed, and degradation of image quality due to noise increase, increase in an area, and reduction in speed may be reduced.

A method in which compressed sensing is applied to an image using Improved Iterative Curvelet Thresholding method is described in J. Ma, "Improved Iterative Curvelet Thresholding for Compressed Sensing and Measurement," IEEE Transactions on Instrumentation and Measurement, Vol. 60, Iss. 1, pp. 126-136, 2011.

The following are related art documents: Japanese Unexamined Patent Publication No. 2010-245955; Japanese Unexamined Patent Publication No. 2004-32517; Toshiyuki Tanaka, "Mathematics of Compressed Sensing," IEICE Fundamentals Review, vol. 4, no. 1, pp. 39-47, 2010; D. Takhar, J. N. Laska, M. B. Wakin. M. F. Durate, D. Baron, S. Sarvotham, K. F. Kelly, and R. G. Baraniuk, "A New Compressive Imaging Camera Architecture using optical-domain compression," Proc. of Computational Imaging IV at SPIE Electronic Imaging, 2006; Y. Oike and A. E. Gamal, "A 256×256 CMOS Image Sensor with ΔΣ-Based Single-Shot Compressed Sensing," IEEE International Solid-State Circuits Conference (ISSCC) Dig. of Tech. Papers, pp. 386-387, 2012; J. Ma, "Improved Iterative Curvelet Thresholding for Compressed Sensing and Measurement," IEEE Transactions on Instrumentation and Measurement, Vol. 60, Iss. 1, pp. 126-136, 2011; Toshihide Ibaraki, Masao Fukushima, "Method of Optimization," Information mathematics course, vol. 14, Kyoritsu Shuppan Co., Ltd., pp. 159-164, Jul. 20, 1993, First Edition/First Copy; and Makoto Nakashizuka, "Sparse Signal Representation and Its Image Processing Application," Journal of the Institute of Image Information and Television Engineers, Vol. 65, No. 10, pp. 1381-1386.

However, the sparsity of an image on which compressed sending is premised is not necessarily achieved in a picture. For example, in an image with a high degree of randomness in which small objects scatter, the sparsity is poor. Therefore, in such an image, even when the method described in Toshiyuki Tanaka, "Mathematics of Compressed Sensing," IEICE Fundamentals Review, vol. 4, no. 1, pp. 39-47, 2010, is used, a problem arises in which the image quality of a reconstruction image is degraded.

In order to solve the above-described problem, a technique disclosed herein has been devised, and it is therefore an object to increase the image quality of a reconstruction image in an imaging device using a compressed sensing.

SUMMARY

According to an aspect, an imaging device includes, a photoelectric conversion unit configured to convert optical signals received by a plurality of pixels to electrical signals, a first charge holding unit configured to accumulate the electrical signals obtained by the photoelectric conversion unit and hold the accumulated signals as charge signals, a second charge holding unit configured to accumulate the electric signals obtained by the photoelectric conversion unit with a different timing from accumulation by the first charge holding unit and hold the accumulated signals as charge signals, a difference calculation unit configured to calculate, for each of the plurality of pixels, a differential value between the charge signal held by the first charge holding unit and the charge signal held by the second charge holding unit and obtain differential signals based on the differential values, a multiple sampling unit configured to perform, on the differential signals obtained by the difference calculation unit, multiple sampling processing which is processing for sampling signals of pixels each located at a predetermined position from an original charge signal and adding up the sampled signals to generate a new signal, and an analog digital conversion unit configured to convert an output signal of the multiple sampling unit to a digital signal.

Thus, in the imaging device, the difference calculation unit calculates a differential signal between the charge signals held by the first charge holding unit and the second charge holding unit and obtain differential signals based on the differential values. The multiple sampling unit performs multiple sampling processing on the differential signals, the analog digital conversion unit converts a signal that has undergone the multiple sampling processing to a digital signal. That is, multiple sampling processing is performed on a differential signal with higher sparsity than that of an image signal. Therefore, image reconstruction with high image quality may be realized using compressed sensing.

According to the present disclosure, in an imaging device using compressed sensing, a differential signal with a high sparsity is used, and therefore, a high quality reconstruction image may be obtained.

BRIEF DESCRIPTION OF THE DRAWINGS

FIG. 9A illustrates a normal captured image, FIG. 9B illustrates an image obtained by reconstructing a picture after multiple sampling of was performed thereon, and FIG. 9C illustrates an image obtained by reconstructing a difference image after multiple sampling was performed thereon.

DETAILED DESCRIPTION

Figure 1:
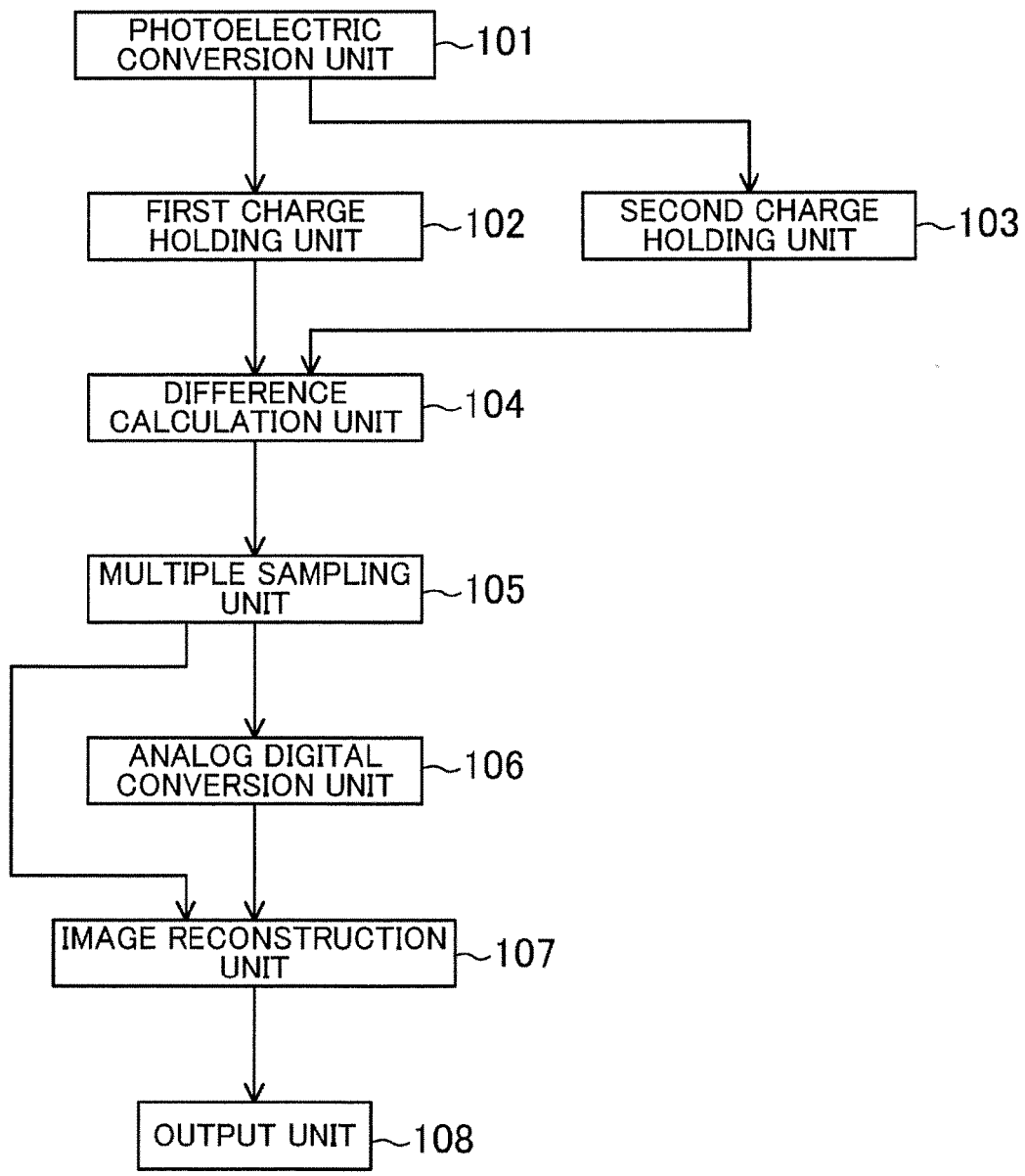
FIG. 1 is a block diagram illustrating a configuration of an imaging device according to a first embodiment.

According to a first aspect, an imaging device includes, a photoelectric conversion unit configured to convert optical signals received by a plurality of pixels to electrical signals, a first charge holding unit configured to accumulate the electrical signals obtained by the photoelectric conversion unit and hold the accumulated signals as charge signals, a second charge holding unit configured to accumulate the electric signals obtained by the photoelectric conversion unit with a different timing from accumulation by the first charge holding unit and hold the accumulated signals as charge signals, a difference calculation unit configured to calculate, for each of the plurality of pixels, a differential value between the charge signal held by the first charge holding unit and the charge signal held by the second charge holding unit and obtain differential signals based on the differential values, a multiple sampling unit configured to perform, on the differential signals obtained by the difference calculation unit, multiple sampling processing which is processing for sampling signals of pixels each located at a predetermined position from an original charge signal and adding up the sampled signals to generate a new signal, and an analog digital conversion unit configured to convert an output signal of the multiple sampling unit to a digital signal.

According to a second aspect, the imaging device according to the first aspect further includes an image reconstruction unit configured to perform reconstruction processing on an output signal of the analog digital conversion unit using multiple sampling information based on processing executed by the multiple sampling unit and obtain an image signal, and an output unit configured to output an image reconstructed by the image reconstruction unit.

According to a third aspect, in the imaging device according to the second aspect, the image reconstruction unit uses a projection transform from which information based on position, direction, and size of an image is extracted.

According to a fourth aspect, in the imaging device according to the third aspect, the projection transform is a curvelet transform or a ridgelet transform.

According to a fifth aspect, the imaging device according to the first aspect further includes a processing switching unit configured to be capable of switching an input of the multiple sampling unit to, instead of the differential signal, the charge signal held by the first or second charge holding unit.

According to a sixth aspect, in the imaging device according to the fifth aspect, at a start of imaging, the processing switching unit sets, instead of the differential signal, the charge signal held by the first or second electric holding unit as an input of the multiple sampling unit.

According to a seventh aspect, in the imaging device according to the fifth aspect, the processing switching unit performs determination for the switching using a signal value of the differential signal.

According to an eighth aspect, in the imaging device according to the seventh aspect, if the signal value of the differential signal is greater than a predetermined value, the processing switching unit sets, instead of the differential signal, the charge signal held by the first or second charge holding unit as an input of the multiple sampling unit.

According to a ninth aspect, an imaging method performed in an imaging device includes holding charge signals of a captured image with different timings, calculating, for each pixel, a differential value for the charge signals held with different timings and obtaining differential signals based on the different values.

Embodiments will be described below with reference to the accompanying drawings.
(First Embodiment)

FIG. 1 is a block diagram illustrating a configuration of an imaging device according to a first embodiment. The imaging device of FIG. 1 includes a photoelectric conversion unit 101, a first charge holding unit 102, a second charge holding unit 103, a difference calculation unit 104, a multiple sampling unit 105, an analog digital conversion unit 106, an image reconstruction unit 107, and an output unit 108.

The photoelectric conversion unit 101 includes a plurality of pixels, and each of the pixels converts a received optical signal to an electrical signal. The plurality of pixels are realized, for example, by arranging photoelectric conversion elements, such as photo diodes, etc., in a two-dimensional manner With different timings, the first and second charge holding units 102 and 103 accumulate electrical signals obtained by the photoelectric conversion unit 101 for a certain amount of time and hold the accumulated signals as charge signals. This may be, for example, realized by providing a plurality of memories used for holding charges and changes a memory that is to be used for each timing of imaging.

The difference calculation unit 104 calculates a differential value between a charge signal held by the first charge holding unit 102 and a charge signal held by the second charge holding unit 103 for each pixel and obtains a differential signal based on the differential values. This may be realized by a known differential circuit. Note that an original image used for obtaining a difference has not been yet captured at a start of imaging, but in this case, an image at an end of previous imaging may be used, an image generated with a random number generator may be given, or an image the entire screen of which is black and gray may be given.

The multiple sampling unit 105 performs multiple sampling processing of the differential signal obtained by the difference calculation unit 104 and generates a new output signal. Multiple sampling information indicating processing that is to be executed by the multiple sampling unit 105 is transmitted to the image reconstruction unit 107. The term "multiple sampling processing" herein means processing for sampling signals of pixels each located at a predetermined position from an original charge signal (the differential signal in this case) to generate a new signal. The multiple sampling information includes information indicating a position of a pixel that has been sampled for use in adding in an original charge signal for each of signal values of new output signals after multiple sampling processing has been performed thereon. Note that, when a gain is given at the time of adding, as will be described later, the multiple sampling information may include information for the given gain.

The multiple sampling unit 105 performs multiple sampling processing, so that compression of image information may be performed and the amount of signal transmitted to the image reconstruction unit 107 may be reduced. The image reconstruction unit 107 uses received multiple sampling information, and thus, may reconstruct an image from compressed image information.

FIGS. 2A-2D are pattern diagrams illustrating multiple sampling processing. For the sake of simplifying the description, processing with 4×4 pixels, that is, 16 pixels, will be described as an example. FIGS. 2A-2D illustrate readout pixels, that is, pixels used in multiple sampling processing, where t=1 to 4. Also, for the purpose of illustration, pixel numbers are given to 4×4 pixels in FIG. 3. That is, in 4×4 pixels, "1," "2," "3," and "4" are given in this order to the pixels arranged from the upper left corner in the direction toward the right, and similarly, "5," "6," ... are given to the pixels arranged from the left end in the next row, and "16" is given to the pixel arranged in the lower right corner.

Figure 2A:
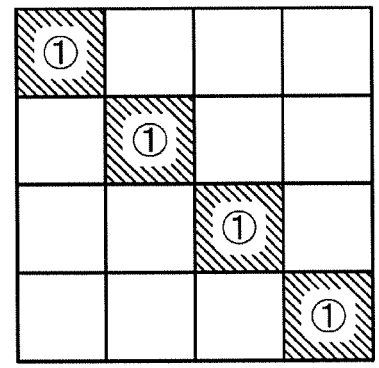
FIGS. 2A-2D are pattern diagrams illustrating an example of multiple sampling processing.
Figure 2B:
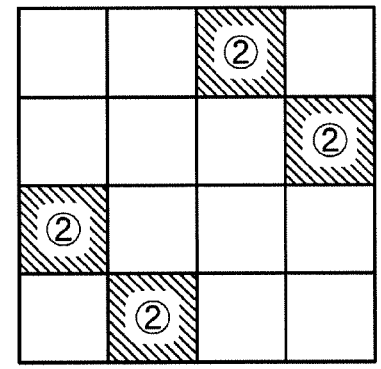
Figure 2C:
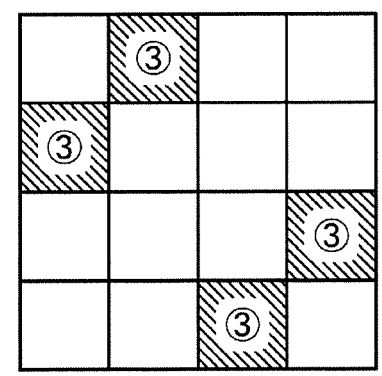
Figures 2D, 3:
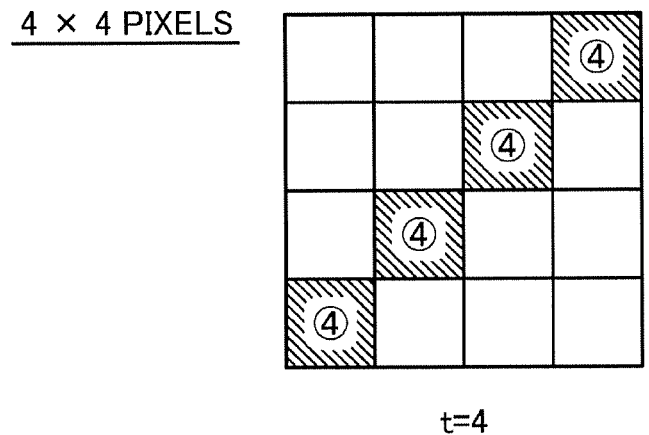
FIG. 3 is a pattern diagram illustrating pixel numbers.

In FIG. 2A, data of pixels with the pixel numbers 1, 6, 11, and 16 is read out and the data of the four pixels is subjected to adding processing, thereby generating an output signal of t=1. Similarly, in FIG. 2B, data of pixels with the pixel numbers 3, 8, 9, and 14 is read out and the data of the four pixels is added up, thereby generating an output signal of t=2. In FIG. 2C, data of pixels with the pixel numbers 2, 5, 12, and 15 is read out and the data of the four pixels is added up, thereby generating an output signal of t=3. In FIG. 2D, data of pixels with the pixel numbers 4, 7, 10, and 13 is read out and the data of the four pixels is added up, thereby generating an output signal of t=4.

In the above described manner, data of 4×4=16 pixels is compressed to four pieces of data of t=1 to 4. Thus, the operation speed of the analog digital conversion unit 105, which will be described later, may be reduced, so that an image with low noise may be reconstructed.

In the multiple sampling processing of FIGS. 2A-2D, multiple sampling information is, for example, as follows. As for t=1 to 4, given that a pixel sampled for adding is denoted by "1" and a pixel which is not sampled is denoted by "0," data coded in the order of the pixel numbers illustrated in FIG. 3 is the multiple sampling information. That is, when t=1, "1000 0100 0010 0001,"
when t=2, "0010 0001 1000 0100,"
when t=3, "0100 1000 0001 0010," and
when t=4, "0001 0010 0100 1000,"

and therefore, these are joined together to obtain the multiple sampling information, that is, "1000 0100 0010 0001 0010 0001 1000 0100 0100 1000 0001 0010 0001 0010 0100 1000."

Note that the format of multiple sampling information is not limited to one illustrated herein, but any format in which the position of a pixel sampled for use in adding is indicated may be used.

Note that in the example of FIGS. 2A-2D, each pixel is read out once in multiple sampling processing. As a matter of course, in multiple sampling processing, the same pixel may be read out a plurality of times.

Figure 4A:
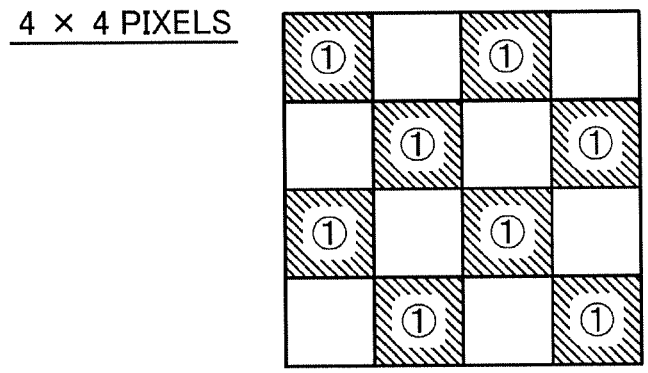
FIGS. 4A-4D are pattern diagrams illustrating an example of multiple sampling processing.
Figure 4B:
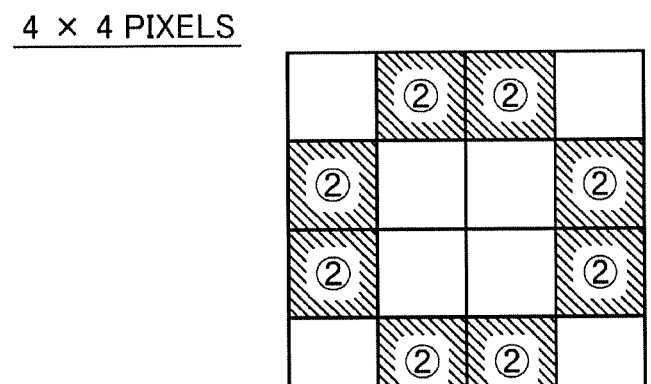
Figure 4C:
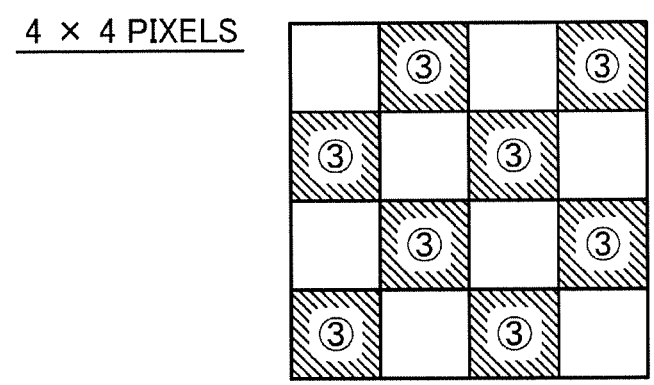
Figure 4D:
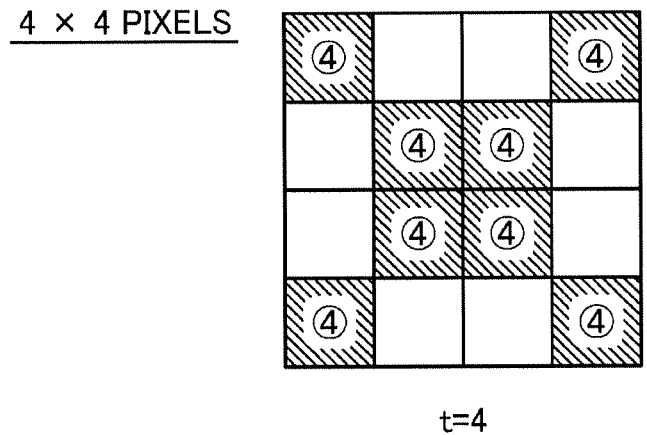

FIGS. 4A-4D are pattern diagrams illustrating an example of the above-described multiple sampling processing. In FIG. 4A, data of pixels with the pixel numbers 1, 3, 6, 8, 9, 11, 14, and 16 is read out and the data of the eight pixels is added up, thereby generating an output signal of t=1. Similarly, in FIG. 4B, data of pixels with the pixel numbers 2, 3, 5, 8, 9, 12, 14, and 15 is read out and the data of the eight pixels is added up, thereby generating an output signal of t=2. In FIG. 4C, data of pixels with the pixel numbers 2, 4, 5, 7, 10, 12, 13, and 15 is read out and the data of the eight pixels is added up, thereby generating an output signal of t=36. In FIG. 4D, data of pixels with the pixel numbers 1, 4, 6, 7, 10, 11, 13, and 16 is read out and the data of the eight pixels is added up, thereby generating an output signal of t=4.

In the above described manner, the dynamic range of an output signal may be increased by reading out each pixel a plurality of numbers of times and performing adding processing, and therefore, noise may be reduced. Such multiple sampling processing is described, for example, in D. Takhar, J. N. Laska, M. B. Wakin. M. F. Durate, D. Baron, S. Sarvotham, K. F. Kelly, and R. G. Baraniuk, "A New Compressive Imaging Camera Architecture using optical-domain compression," Proc. of Computational Imaging IV at SPIE Electronic Imaging, 2006, and Y. Oike and A. E. Gamal, "A 256×256 CMOS Image Sensor with ΔΣ-Based Single-Shot Compressed Sensing," IEEE International Solid-State Circuits Conference (ISSCC) Dig. of Tech. Papers, pp. 386-387, 2012.

In multiple sampling processing, a pixel position where sampling is performed may be selected at random and/or independently. Thus, degradation of image information due to sampling processing may be reduced, and the image quality of a reconstruction image may be improved (see, for example, pp. 43-44 of Toshiyuki TANAKA, "Mathematics of Compressed Sensing," IEICE Fundamentals Review, vol. 4, no. 1, pp. 39-47, 2010).

Figure 5A:
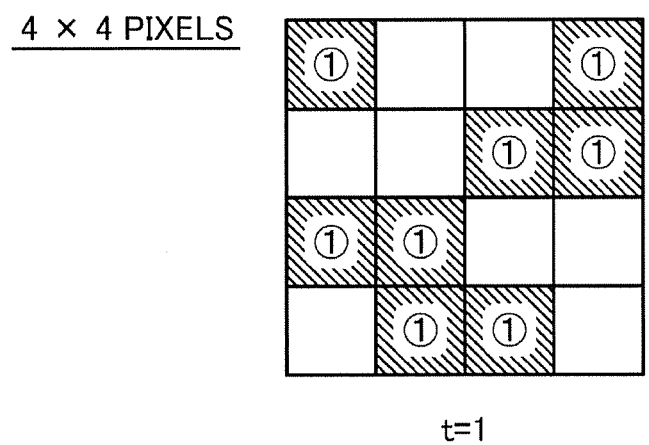
FIGS. 5A-5D are pattern diagrams illustrating an example of multiple sampling processing.
Figure 5B:
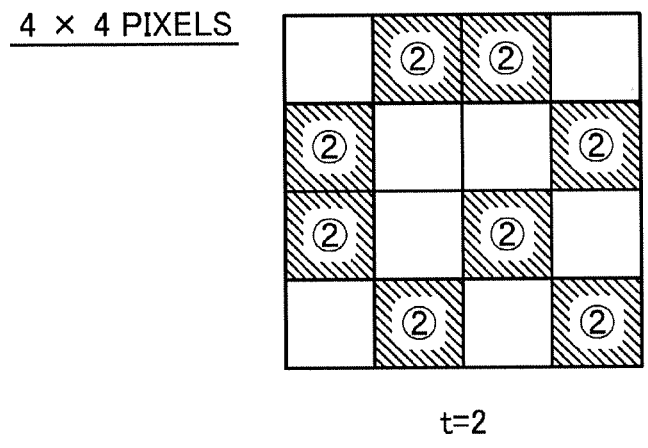
Figure 5C:
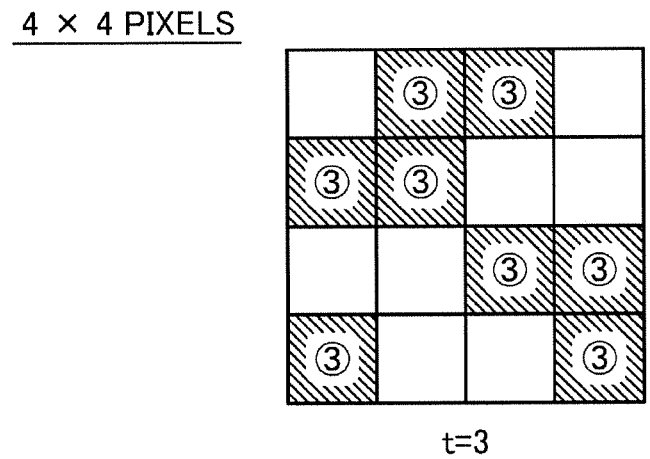
Figure 5D:
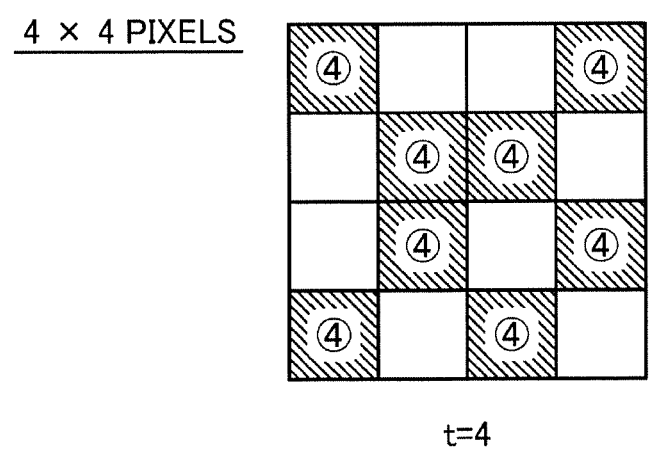

FIGS. 5A-5D are pattern diagrams illustrating an example of multiple sampling processing in which a pixel position where sampling is performed is selected at random. In FIG. 5A, data of pixels with the pixel numbers 1, 4, 7, 8, 9, 10, 14 and 15 is read out and the data of the eight pixels is added up, thereby generating an output signal of t=1. Similarly, in FIG. 5B, data of pixels with the pixel numbers 2, 3, 5, 8, 9, 11, 14 and 16 is read out and the data of the eight pixels is added up, thereby generating an output signal of t=2. In FIG. 5C, data of pixels with the pixel numbers 2, 3, 5, 6, 11, 12, 13 and 16 is read out and the data of the eight pixels is added up, thereby generating an output signal of t=3. In FIG. 5D, data of pixels with the pixel numbers 1, 4, 6, 7, 10, 12, 13 and 15 is read out and the data of the eight pixels is added up, thereby generating an output signal of t=4.

Also, in multiple sampling processing, a gain may be given and weighing and adding may be performed, instead of merely adding up a plurality of pieces of pixel data. When a plurality of pieces of pixel data are added up, the dynamic range of data after adding has been performed increases, and the load of the analog digital conversion unit 106 increases. In order to solve this problem, it is effective to perform weighing and adding on pixel data. For example, when multiple sampling processing illustrated in FIGS. 2A-2D is performed, in order to cause the dynamic range of data after adding has been performed to match that of original pixel data, in normalization processing, a weight 1/4 may be given as a gain.

The analog digital conversion unit 106 converts a signal generated in the multiple sampling unit 105 to a digital signal. This processing may be executed using a pipeline type or column type analog digital converter, which is widely known.

The image reconstruction unit 107 performs reconstruction processing on the digital signal generated by the analog digital conversion unit 106 using multiple sampling information transmitted from the multiple sampling unit 105, and obtains an image signal. Note that a reconstruction image is a difference image, and therefore, for example, the reconstructed difference image is added to an image in a previous frame, thereby obtaining a final reconstruction image. Note that, for reconstruction processing in this case, a known technique, such as an improved iterative curvelet thresholding method (see, for example, J. Ma, "Improved Iterative Curvelet Thresholding for Compressed Sensing and Measurement," IEEE Transactions on Instrumentation and Measurement, Vol. 60, Iss. 1, pp. 126-136, 2011), an affine scaling method (see, for example, Toshihide Ibaraki, Masao Fukushima, "Method of Optimization," Information mathematics course, vol. 14, Kyoritsu Shuppan Co., Ltd., pp. 159-164, Jul. 20, 1993, First Edition/First Copy), etc., which are widely used in compressed sensing, may be used.

The output unit 108 is an interface configured to display an image reconstructed by the image reconstruction unit 107 on a display and to output the image for use in image processing, such as person detection, etc.

Figure 6:
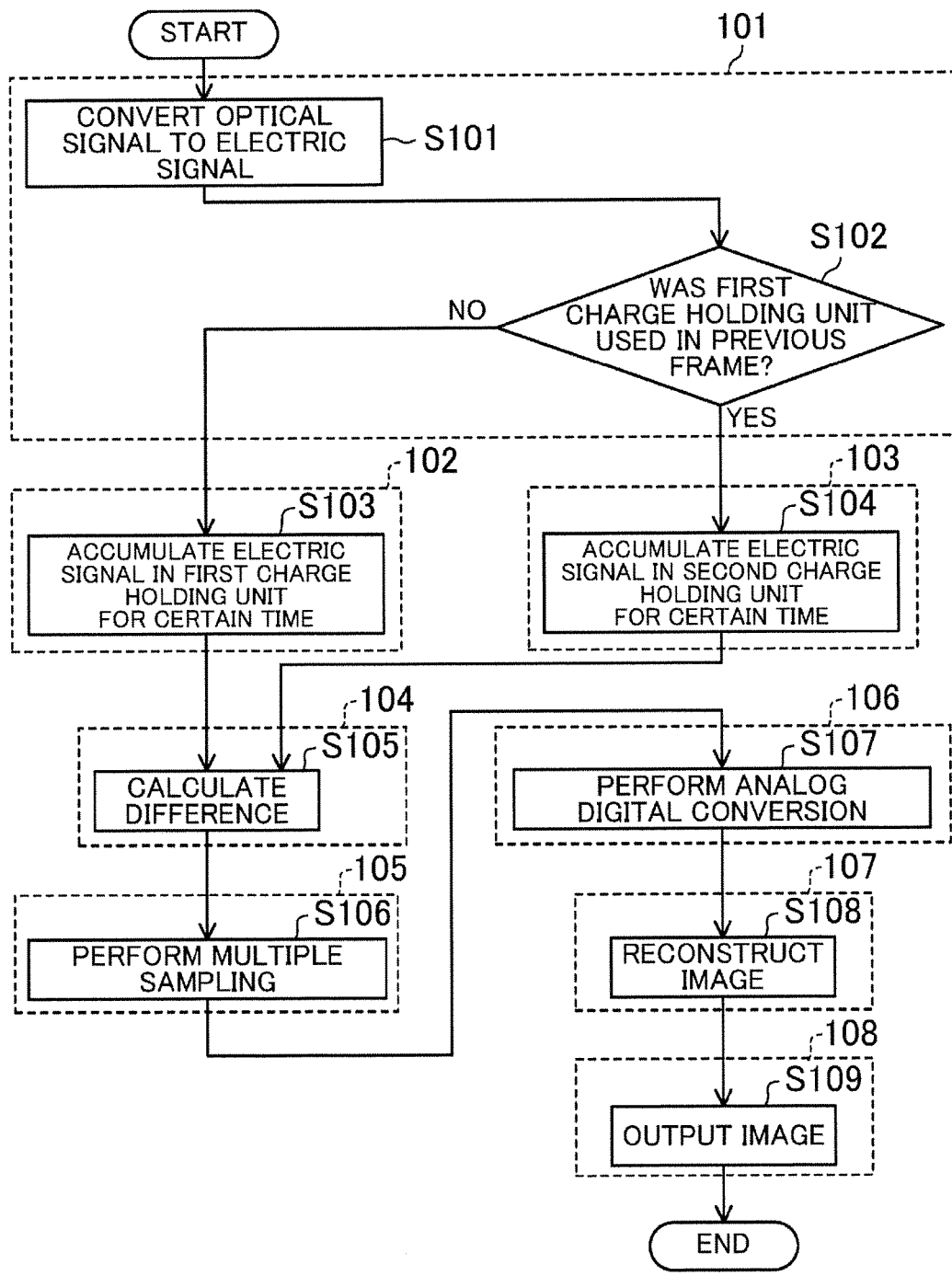
FIG. 6 is a flow chart illustrating an example of processing performed in an imaging device according to the first embodiment.

FIG. 6 is a flow chart illustrating an example of processing performed in an imaging device according to this embodiment. First, in Step S101, the photoelectric conversion unit 101 converts an optical signal to an electric signal. Thus, a captured image is obtained. Then, if the first charge holding unit 102 is not used in a previous frame (NO in Step S102), the first charge holding unit 102 accumulates electrical signals converted by the photoelectric conversion unit 101 for a certain amount of time and holds the accumulated signals as charge signals (Step S103). If the first charge holding unit 102 is used in the previous frame (YES in Step S102), on the other hand, the second charge holding unit 103 accumulates electrical signals converted by the photoelectric conversion unit 101 for a certain amount of time and holds the accumulated signals as charge signals (Step S104).

That is, the first and second charge holding units 102 and 103 are cyclically used in a manner in which the second charge holding unit 103 is used in a next frame in which the first charge holding unit 102 is used, and the first charge holding unit 102 is used in a next frame in which the second charge holding unit 103 is used. Next, in Step S105, the difference calculation unit 104 calculates a differential signal between a charge signal accumulated in the first charge holding unit 102 and a charge signal accumulated in the second charge holding unit 103. Thus, differential information for each pixel is calculated as a differential signal between frames that are adjacent to each other in terms of time.

Next, in Step S106, the multiple sampling unit 105 performs multiple sampling processing on the differential signal calculated by the difference calculation unit 104 and generates a new output signal. Then, in Step S107, the analog digital conversion unit 106 converts a signal generated by the multiple sampling unit 105 to a digital signal.

Next, in Step S108, the image reconstruction unit 107 reconstructs an image from a digital signal generated by the analog digital conversion unit 106 using multiple sampling information transmitted from the multiple sampling unit 105. Then, in Step S109, the output unit 108 outputs a reconstruction image to the outside of the imaging apparatus.

Advantages achieved when a difference image is used in compressed sensing will be described below.

It is known that, in compressed sensing, when an input image is projected to a space, as sparsity of a coefficient vector thereof increases, reconstruction image quality increases. That is, it is important in increasing reconstruction image quality to use a space in which an input image may be expressed in a sparse manner The study of the present inventors has revealed that, in a difference image formed of a differential signal of charge signals, sparsity is high.

Figure 7A:
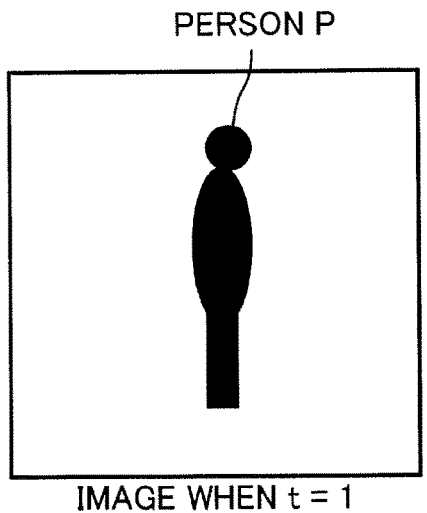
FIGS. 7A-7C are pattern diagrams illustrating an example of reconstruction processing using a difference image.
Figure 7B:
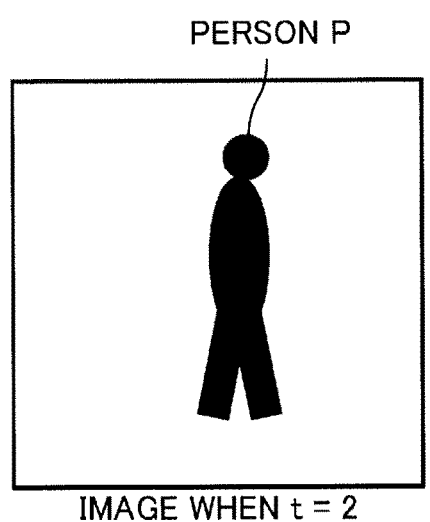
Figure 7C:
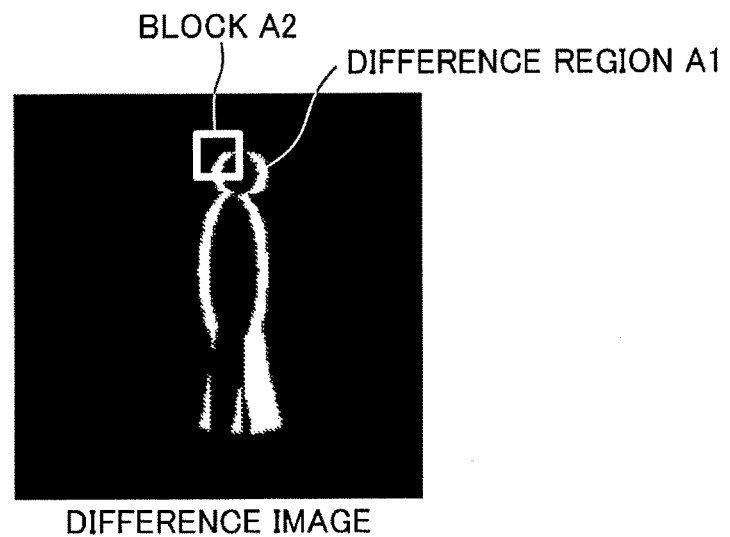
Figure 8A:
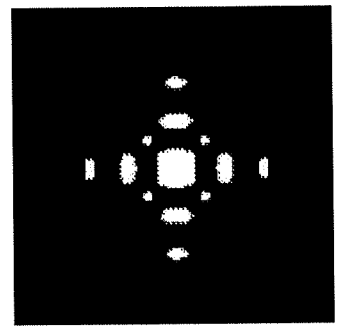
FIGS. 8A-8F are pattern diagrams illustrating atom in a curvelet transform in which information based on position, direction, and size of an image is extracted.
Figure 8B:
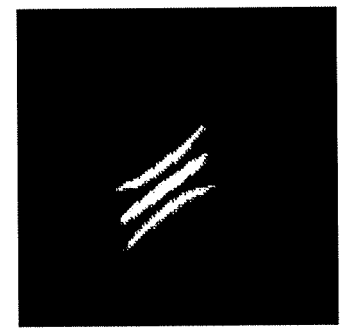
Figure 8C:
Figure 8D:
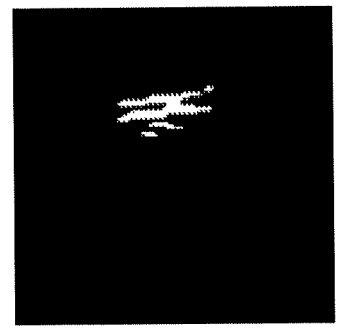
Figure 8E:
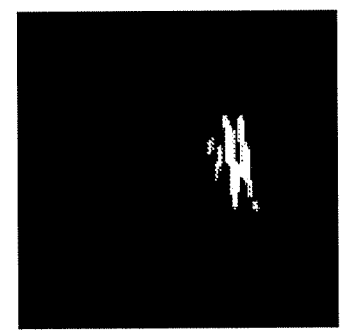
Figure 8F:
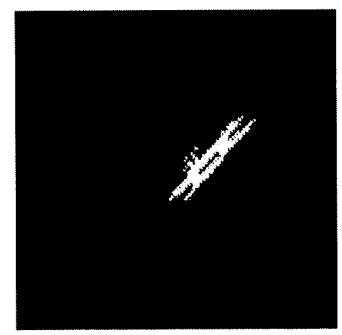

FIGS. 7A-7C are pattern diagrams illustrating an example of reconstruction processing using a difference image. FIG. 7A illustrates an image obtained by capturing a person P when t=1, and FIG. 7B illustrates an image obtained by capturing the person P when t=2. In FIG. 7C, a region Al which is a difference image between the image obtained when t=1 and the image obtained when t=2 and where there is a differential value is illustrated in white.

In this case, if a subject is a person or an animal, a difference image is expressed by a combination of curves, as in the region Al. For example, when viewing a block A2 of FIG. 7C, as a difference region, there is a circular arch which has about a half size of the size of the block and the center of which is at right lower part at the right bottom of the block. Incidentally, a curve is expressed by three pieces of information, that is, a position, an angle, and a size. On the basis of the foregoing, it is considered that, by projecting a difference image in a space that may be expressed by position information, a direction component, and size information, the difference image is caused to have increased sparsity. Therefore, as a space in which a difference image is projected, a transform in which information based on the position, direction, and size of an image is extracted is used. Thus, sparsity of the image may be increased.

FIGS. 8A-8F are pattern diagrams illustrating some of atoms in curvelet transform, which is an example of conversion in which information based on the position, direction, and size of an image is extracted. Note that, in compressed sensing, an attention signal is expressed by a linear combination of a small number of vectors, and these vectors are called atoms. Note that, when these vectors are orthogonal, these vectors are called basis vector. The difference image in the block A2 of FIG. 7C looks similar to an atom illustrated in FIG. 8F, and this indicates that curvelet transform is effective.

Figure 9A:
FIGS. 9A-9C are pattern diagrams illustrating an example of an actual image on which compressed sensing was performed.
Figure 9B:
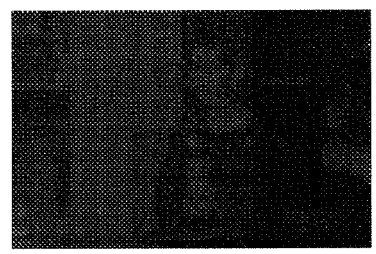
Figure 9C:

FIGS. 9A-9C are pattern diagrams illustrating an example of an actual image on which compressed sensing was performed, FIG. 9A illustrates a normal captured image when multiple sampling was not performed, FIG. 9B illustrates an image obtained by reconstructing a picture using curvelet transform after multiple sampling was performed thereon, and FIG. 9C illustrates an image obtained by adding an image in a previous frame on an image obtained by reconstructing a difference image using curvelet transform after multiple sampling was performed thereon.

In a picture illustrated in FIGS. 9A-9C, a global component is dominant, and therefore, the picture is not expressed in a sparse manner by a local atom used for curvelet transform. For this reason, as illustrated in FIG. 9B, when a picture is used in compressed sensing, a large error is generated in a reconstruction image. On the other hand, a difference image thereof is an image that may be expressed by local position information, a direction component, and size information, and therefore, the difference image may be expressed in a sparse manner by curvelet transform. Accordingly, as illustrated in FIG. 9C, an image with high image quality may be reconstructed.

Note that a projection transform used for image reconstruction is not limited to a curvelet transform. In addition to a curvelet transform, for example, a ridgelet transform having a local atom may be used.

It is needless to say that, as a reconstruction technique, a known technique, such as a matching pursuits method, a matching pursuit denoising method, may be used (see, for example, Makoto Nnakashizuka, "Sparse Signal Representation and Its Image Processing Application," Journal of the Institute of Image Information and Television Engineers, Vol. 65, No. 10, pp. 1381-1386).

As has been described above, according to this embodiment, using the first and second charge holding units 102 and 103 that accumulate electrical signals obtained by the photoelectric conversion unit 101, a differential signal of a captured image is obtained. Then, multiple sampling processing is performed on the differential signal to convert a generated signal to a digital signal. By performing image reconstruction processing based on a compressed sensing technique on the digital signal, a reconstruction image with high image quality may be obtained. Furthermore, a space which has a local atom and in which information based on the position, direction, and size of an image is extracted is used as a projective space used in compressed sensing, so that a reconstruction image with even higher image quality may be realized.

Note that, as an imaging device employing a plurality of charge holding units, a charge coupled device (CCD) is widely known. However, an imaging device according to this embodiment calculates a differential signal of an image by using a plurality of charge holding units, and thus, increases sparsity of the image by executing multiple sampling processing on the differential signal. A totally different technique from that for CCD is used in this embodiment.

A technique using differential information of a captured image using a plurality of memories is widely known. For example, Japanese Unexamined Patent Publication No. 2004-32517 describes a technique in which, in order to enable highly accurate focus control, a plurality of added images, average images, and difference images are used. However, this is a technique in which, after analog digital conversion is performed, difference processing or the like is performed on an obtained digital signal using a plurality of memories. On the other hand, an imaging device according to this embodiment performs difference processing before analog digital conversion is performed, and is totally different from a known imaging device. That is, an imaging device according to this embodiment uses a difference image in a compressed sensing technique, performs analog digital conversion after having performed multiple sampling processing on a difference image, and restores an image with higher image quality from an obtained digital signal.

(Second Embodiment)

Figure 10:
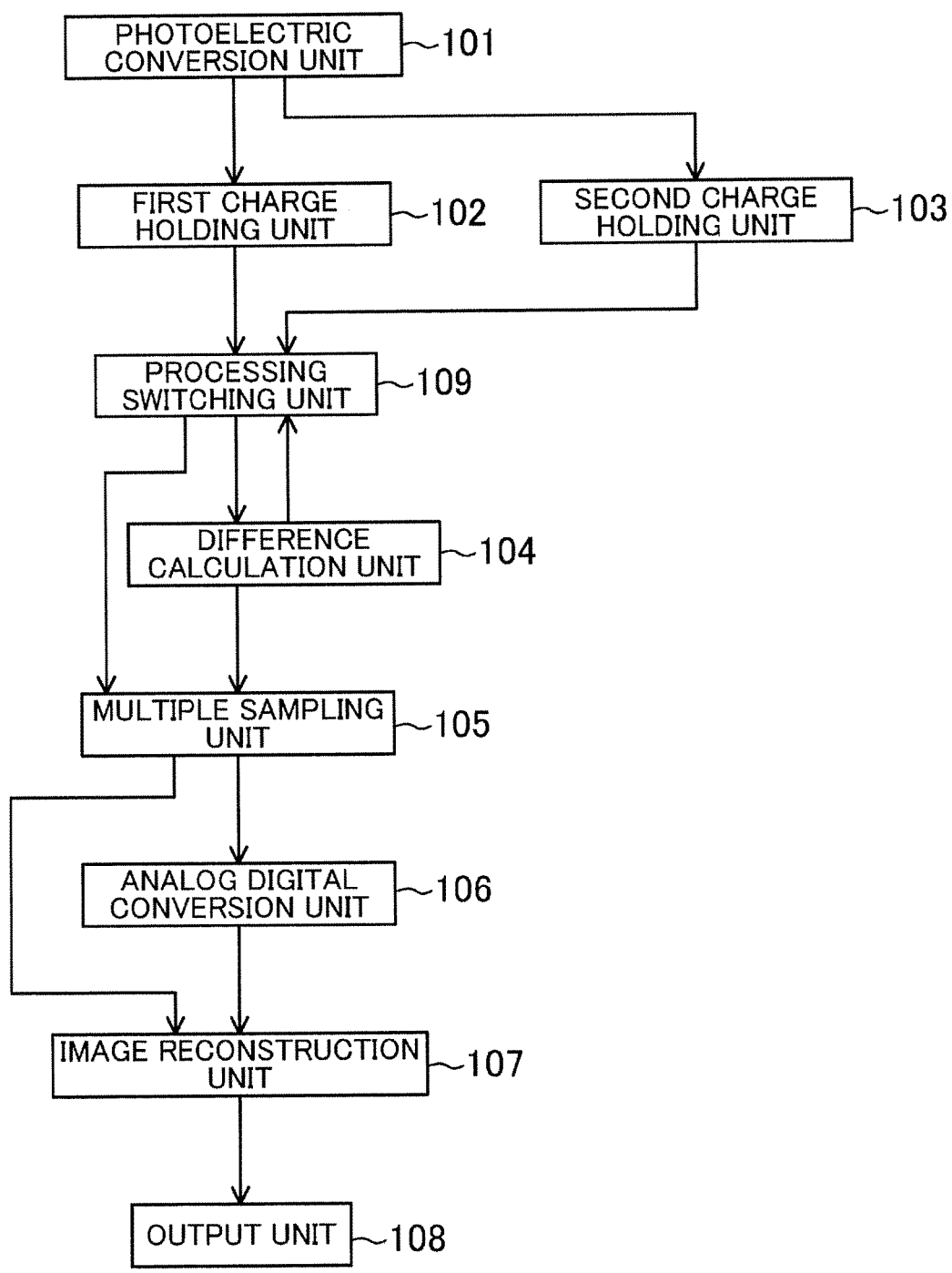
FIG. 10 is a block diagram illustrating a configuration of an imaging device according to a second embodiment.

FIG. 10 is a block diagram illustrating a configuration of an imaging device according to a second embodiment. In FIG. 10, each component element which is similar to or the same as a corresponding component in FIG. 1 is denoted by the same reference character as that used in FIG. 1, and the detailed description thereof will be omitted.

The imaging device of FIG. 10 further includes, in addition to the component elements of the imaging device of FIG. 1, a processing switching unit 109.

The processing switching unit 109 is capable of switching an input of the multiple sampling unit 105 to, instead of a differential signal output from the difference calculation unit 104, a charge signal held by the first or second charge holding unit 102 or 103. That is, whether or not multiple sampling processing is to be performed on a differential signal of respective charge signals held by the first and second charge holding units 102 and 103, or whether multiple sampling processing is to be performed on a charge signal held by the first charge holding unit 102 or a charge signal held by the second charge holding unit 103 is switched by the processing switching unit 109. When multiple sampling processing is performed on a charge signal held by the first or second charge holding unit 102 or 103, the difference calculation unit 104 may stop difference calculation.

The processing switching unit 109 performs determination of the switching in accordance with a status of imaging. For example, at a start of imaging, the processing switching unit 109 sets a charge signal held by the first or second charge holding unit 102 or 103 as an input of the multiple sampling unit 105. Immediately after imaging is started, the image reconstruction unit 107 does not have an image of a previous frame, which is necessary for image reconstruction. Thus, at a start of imaging, the processing switching unit 109 gives an output signal of the first or second charge holding unit 102 or 103 to the multiple sampling unit 105 and causes the multiple sampling unit 105 to perform processing. Thus, a reconstruction image may be obtained even at a start of imaging, although image quality of the reconstruction image is low. Thereafter, by executing multiple sampling on a difference image, the image quality of the reconstruction image may be increased.

The processing switching unit 109 may perform determination of the switching using a signal value of a differential signal between respective charge signals held by the first and second charge holding units 102 and 103. In this case, the processing switching unit 109 may use an output of the difference calculation unit 104.

For example, when the signal value of the differential signal is greater than a predetermined value, an output signal of the first or second charge holding unit 102 or 103, not the differential signal, is an input of the multiple sampling unit 105. When the differential value is great, it is assumed that a subject has greatly changed due to a scene change or an illuminant change. In this case, the differential signal is no longer enough sparse, and therefore, it is more likely that, when multiple sampling processing is performed on the differential signal, image quality is rather degraded. Thus, an output signal of the first or second charge holding unit 102 or 103 is processed by the multiple sampling unit 105 without using the differential signal, thereby maintaining image quality of a reconstruction image.

On the other hand, when the differential value is small, a differential signal calculated by the difference calculation unit 104 is an input of the multiple sampling unit 105. When the differential value is small, as described in the first embodiment, an image may be expressed in a sparse manner by using a differential signal, and therefore, image quality of a reconstruction image may be increased. Furthermore, the imaging device may be configured such that, when the differential value is close enough to zero, multiple sampling processing for the image is not performed. This is because, in this case, an image of a previous frame may be used as it is for reconstruction processing, and therefore, processing of the image is not needed to be performed.

Note that, when processing switching using a signal value of a differential signal is performed, a region unit used for determining switching may be, for example, a region in which multiple sampling processing is performed. For example, a total sum of signal values of differential signals may be obtained for each region in which multiple sampling processing is performed, and determination for processing switching in the region may be performed on the basis of the obtained value. In this case, an image includes a region in which multiple sampling processing is performed on a differential signal and a region in which multiple sampling processing is performed on an original charge signal. Note that a region unit used for determining switching is not limited to a region in which multiple sampling processing is performed, but a region in another predetermined range may be used as a unit. As another alternative, a total sum of signal values of differential signals may be obtained in an entire image, and determination for switching processing for the entire image may be performed.

As has been described, according to this embodiment, the processing switching unit 109 is provided, thereby allowing selection of appropriate multiple sampling processing in accordance with a status of imaging and change in input image, and therefore, image reconstruction with higher image quality may be realized.

Note that, in each of the above-described embodiments, an imaging device has a configuration including an image reconstruction unit and an output unit, but is not limited thereto. For example, a configuration that does not to include an image reconstruction unit may be employed such that a digital signal obtained by an analog digital conversion unit and multiple sampling information are output to the outside of the imaging device.

Also, multiple sampling information used by the image reconstruction unit does not necessarily have to be information indicating processing itself that was executed by the multiple sampling unit. For example, the image reconstruction unit may be configured to use multiple sampling information having a resolution that has been reduced to a level lower than that in processing executed by the multiple sampling unit. Thus, a reconstruction image with a low resolution may be obtained. That is, multiple sampling information used by the image reconstruction unit may be based on processing executed by the multiple sampling unit.

Note that, an imaging device described herein may not be realized as a device. For example, the above-described operation of the imaging device may be performed by causing a general-purpose processor that is a computer to execute a computer program recorded in a computer-readable recording medium. The computer program includes, for example, an order group that causes the computer to execute processing realized by the flow chart of FIG. 6. The computer program is recorded in a recording medium, such as a CD-ROM, etc., and is distributed as a product in the market, or is transmitted via an electric communication line, such as the Internet, etc.

The present disclosure is useful for enabling, in an imaging device, reconstruction of an image with high image quality while realizing low power consumption, a high SN ratio, and reduction in communication band.

What is claimed is:

1. An imaging device, comprising:
a photoelectric conversion unit including a plurality of pixels and configured to convert optical signals received by the plurality of pixels to electrical signals;
a first charge holding unit configured to accumulate the electrical signals obtained by converting the optical signals by the photoelectric conversion unit and hold the accumulated signals as first charge signals;
a second charge holding unit configured to accumulate the electric signals obtained by converting the optical signals by the photoelectric conversion unit with a different timing from accumulation by the first charge holding unit and hold the accumulated signals as second charge signals;
a difference calculation unit configured to obtain differential signals based on differential values between the first charge signals and the second charge signals, by calculating, for each of the plurality of pixels, a differential value between a corresponding first charge signal held by the first charge holding unit and a corresponding second charge signal held by the second charge holding unit;
a multiple sampling unit configured to perform, on the differential signals obtained by the difference calculation unit, multiple sampling processing which is processing for sampling signals of pixels each located at a predetermined position from an original charge signal and adding up the sampled signals to generate a new signal;
an analog digital conversion unit configured to convert an output signal of the multiple sampling unit to a digital signal;
an image reconstruction unit configured to perform reconstruction processing on an output signal of the analog digital conversion unit using multiple sampling information based on processing executed by the multiple sampling unit and obtain an image signal; and
an output unit configured to output an image reconstructed by the image reconstruction unit.

2. The imaging device of claim 1, wherein
the multiple sampling unit performs the multiple sampling processing by a predetermined pixel unit selected from the differential signals of the plurality of pixels.

3. The imaging device of claim 2, wherein
the predetermined pixel unit is comprised of pixels not adjacent to each other.

* * * * *